Figure 1:
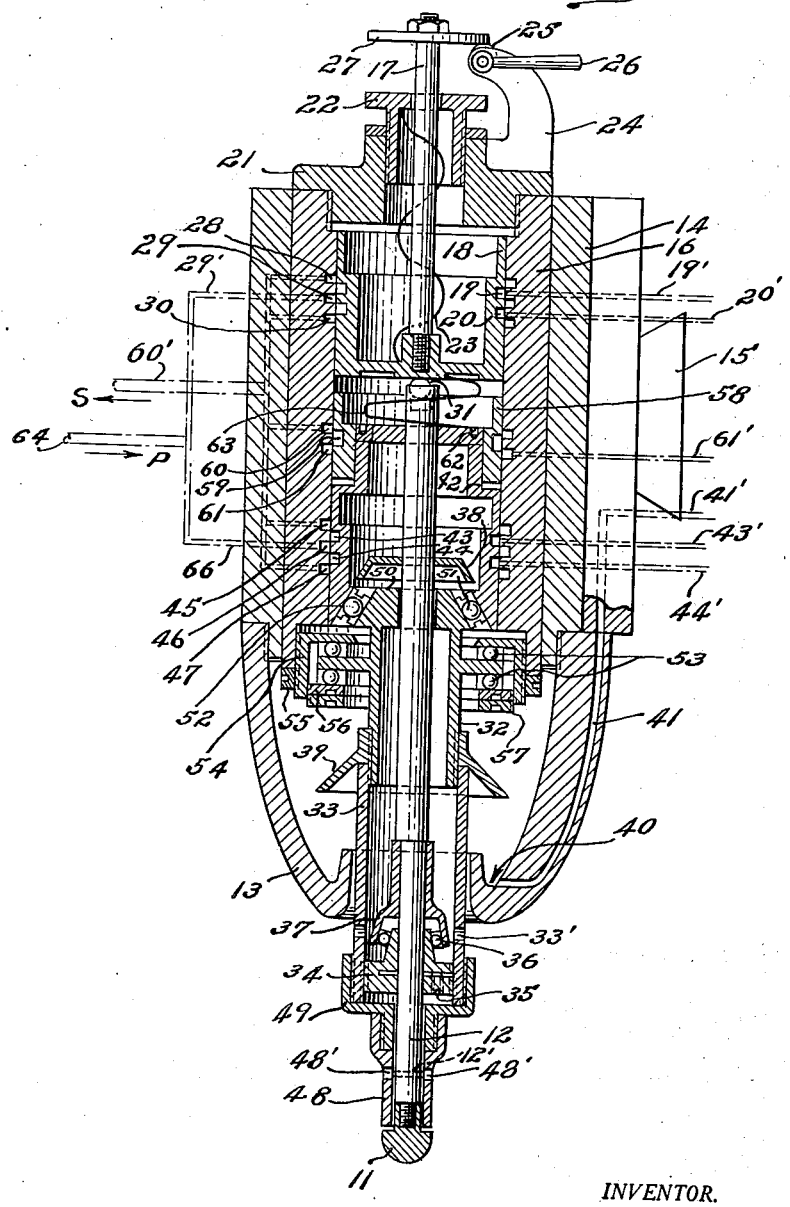

Oct. 12, 1943. M. TURCHAN ET AL 2,331,817
PROFILING AND CONTOURING TRACER
Original Filed Nov. 18, 1940

INVENTOR.
Manuel Turchan
BY Curtis Walker
Robert A. Sloman
ATTORNEY

Patented Oct. 12, 1943

2,331,817

UNITED STATES PATENT OFFICE 2,331,817

PROFILING AND CONTOURING TRACER

Manuel Turchan, Dearborn, and Curtis Walker, Detroit, Mich.

Original application November 18, 1940, Serial No. 366,082. Divided and this application May 15, 1942, Serial No. 443,156

18 Claims. (Cl. 90—62)

The present application is a divisional part of Serial No. 366,082, filed November 18, 1940.

This invention relates to a novel profiling and contouring tracer mechanism adapted to be employed in combination with a directional control mechanism, and a plurality of feed control cylinders for regulating relative feeds of a cutter and a work table, vertically and transversely in two directions at right angles, as fully set out in the above mentioned parent application, Serial No. 366,082.

It is the object, herein, to provide a tracer mechanism for controlling profiling and contouring work of a cutting mechanism for reproducing various patterns in metal or other material.

It is the object hereof to provide a tracer mechanism for hydraulically controlling longitudinal-feed, cross-feed, and vertical-feed of a work table or a cutter or a plurality of cutters.

It is the object herein to provide a tracer mechanism, embodying certain safety mechanisms whereby the various feeds may be regulated and controlled throughout profiling and contouring operations of a cutting tool.

It is the still further object hereof that said tracer mechanism be adaptable for use in conjunction with a milling machine, a lathe, a boring mill, and others.

It is the further object herein to provide a tracer characterized by vertically operable means therein for controlling relative vertical feed movements between a cutter and a work table, at the same time characterized by laterally translatable means for alternately governing relative transverse feed movements of said cutter and work table.

It is the further object herein to provide a tracer mechanism having means therein for limiting lateral movements of the tracer spindle to merely translatory movements without tilting.

It is the still further object of this invention to provide within said tracer, safety valve means adapted for connection to either one or the other of the cross feed cylinders at the moment that the other is under tracer control for limiting exhausting therefrom to thereby slow down or actually stop constant cross feeding at the moment that the other cross feed directional movement under tracer control is reversed for tracer control cross feeding in the opposite direction.

It is the still further object of this invention to provide a tracer mechanism for operation in conjunction with a work supporting table adapted for relative reciprocable longitudinal and cross feeding with respect to a cutter, together with means for intermittently placing tracer control on either the longitudinal or the cross feed, and also means governing the other movement not under tracer control, by governing the exhausting of fluid therefrom.

The objects hereinabove set out and others hereinafter described are accomplished by means of the various arrangements of elements within the tracer and their various combinations as hereinafter set out and described in connection with the appended drawing of which the single figure is a sectional elevation of the tracer mechanism.

The drawing above merely sets out by way of description the inventors' preferable embodiment of the invention, it being expressly understood that other embodiments are possible within the scope of the invention hereinafter set out in the appended claims.

Referring to the drawing, the tracer mechanism consists of a tracer tip 11 threadably and adjustably secured and carried by spindle 12. Said spindle is adapted to slight axial reciprocation being longitudinally disposed within tracer barrel 13 and supported by the tracer housing in the manner hereinafter described.

Barrel member or valve body 13 is axially and threadedly joined to tracer body 14, the latter being provided with a dovetail 15, or other suitable device for adjustable attachment to a tracer arm or supporting member.

Valve cylinder member 16 within body 14 is provided with a plurality of inlets and outlets as will be hereinafter set out in detail.

A piston stem 17 centrally and axially disposed within the tracer cylinder 16 is threadably or otherwise secured to piston 18 which is provided with annular openings 19 and 20.

Cap 21 threaded into the top of tracer cylinder 16, has centrally threaded therethrough a spring adjusting nut 22 adapted to regulate the resiliency of coil spring 23, whereby a downward pressure is exerted upon the bottom of valve piston 18.

A regulator is provided for manually operating piston 18 which consists of a bracket 24 and a cam 25 rotatively journaled upon the upper end thereof, and actuated by hand lever 26.

Disc member 27 secured to stem 17 cooperates with cam 25, and is adapted to cause movement of valve 18 upon actuation of the control arm 26.

Opening 19 in valve 18 connects a conduit 19' adapted for providing fluid communication to, for instance, the lower end of a vertical feed controlling cylinder; while opening 20 connects a conduit 20' adapted for fluid communication to the upper end of said cylinder.

Valve cylinder 16 is provided with a plurality of annular openings 28, 29 and 30; 29 being a fluid inlet opening connected through a suitable passage in the tracer body to conduit 29' which is joined to an exterior fluid pressure source.

Movement of piston 18 permits fluid under pressure to enter either side of said cylinder through either conduit 19' or 20'. Openings 28 and 30 are exhaust ports connected to a common outlet 60' in tracer housing 14, for return through a suitable conduit to a fluid pressure sump.

Exhaust from either side of the vertical movement control cylinder returning through either conduit 19' or 20', and/or ports 19 and 20, consequently is free to exhaust through either exhaust port 28 or 30 depending upon the position of piston 18.

Movement of piston 18 is governed by the tracer tip actuated spindle 12, a suitable ball contact 31 being preferably provided to register with the bottom and central portion of the said piston.

Spindle 12 is journaled through a stabilizer sleeve 32, and adjusting sleeve 33 threaded thereto, and also through an adjusting and supporting cone 34, the latter being adjustably threaded within said adjusting sleeve. It will be noted that said cone is split and is provided with a set screw 35 for locking the same in place. Furthermore sleeve 33 has openings 33' therein to facilitate adjustment thereof with respect to the stabilizer sleeve 32.

Furthermore, the spindle is supported with a minimum of friction upon said adjusting cone, the angle thereof being 15°, though the invention is not limited to that angle. A ball bearing retainer 36 rests upon cone 34, and is adapted to cooperate and engage with a minimum of friction cone race 37 rigidly secured to spindle 12 with its sides disposed at an angle complementary to the angle of the adjusting cone.

Umbrella members 38 and 39 are provided whereby leaking oil is prevented from running down the spindle and onto the tracer tip 11. Said leaking oil gravitates to the lower portion 40 of the tracer skirt member 13, whereby it is scavenged out through opening 41 which communicates by suitable conduit 41' to a vacuum source within a fluid sump.

A second valve is provided within the tracer whereby relative cross-feed and longitudinal-feed may be governed alternately throughout contouring and profiling operations.

Said valve consists of a piston 42 with annular openings 43 and 44 for providing alternate communication through separate openings in the tracer housing and conduits 43' and 44' to opposite sides of the cross-feed or longitudinal-feed cylinders I or H through an intermediate directional control valve B as fully described in our co-pending application, Serial No. 366,082.

Annular openings 45, 46 and 47 are formed within tracer cylinder 16, inlet opening 46 being joined to the fluid pressure source by a suitable conduit 66 within the tracer housing 14. Reciprocable movement of piston 42 permits fluid under pressure to enter either opening 43 or 44.

Openings 45 and 47 are exhaust openings joining a common outlet 60' for conducting an exhaust from either 43 or 44, back to a fluid sump depending upon the position of piston 42 with respect to cylinder member 16.

Piston 42 is actuated by lateral translation of adaptor 48, caused by lateral thrusts of a pattern upon adaptor member 48 through which spindle 12 is slidably disposed. It will be noted that a suitable clearance is provided between the end of said adaptor and the tracer tip so as to permit axial movement thereof with respect thereof with respect thereto. Or on the other hand a lateral thrust may be received by the tracer tip.

Member 48 is threadably secured to the adaptor nut 49, which is in turn threadably secured to the adjusting sleeve 33. Openings 48' are provided therein to correspond with slot 12' permitting axial adjustment of the tracer tip 11 with respect to the tracer spindle 12.

Lateral translation of adaptor 48 consequently causes lateral translation of the stabilizer sleeve, the upper portion 50 thereof having an annular surface inclined at an angle of preferably 30°.

A ball bearing retainer 51 is interposed between member 50 and the complementary inclined surface 52 on the lower end of piston 42. Thus lateral movement of member 50 causes a movement at right angles thereto of piston member 42.

The stabilizer sleeve 33 is limited to a translational movement at right angles to the tracer axis by means of the ball bearings 53, interposed between the stabilizer sleeve and the stabilizer housing 54.

Housing 54 is threadably and adjustably secured within the tracer cylinder 16 and secured by lock nut 55. Lock nuts 56 and 57 within said housing are adapted to retain said bearings 53, and the stabilizer sleeve with respect to the stabilizer housing.

A safety valve is provisioned within the tracer cylinder consisting of a piston member 58 which threadably engages piston 42 and is carried thereby. An annular recess 59 in piston 58 is adapted for communicating engagement with annular recesses 60 and 61 formed within cylinder member 16, lock nut 62 being provided for securing piston 58 with respect to piston 42. It will be noted that said safety valve may be operated by the upper control piston 18 if desired.

If, for instance, outlets 43 and 44 are connected through conduits 43' and 44' to opposite ends of a longitudinal-feed cylinder H through an intermediate directional control valve B as fully described in our co-pending application, Serial No. 366,082, then through said control valve 58, the exhaust from one side of the cross-feed cylinder is connected through conduit 61' with exhaust inlet 61, which through recess 59 communicates with exhaust outlet 60. 60, in turn through the tracer body joins the exhaust return conduit 60' to a fluid sump.

Consequently, whenever piston 42 is actuated by a deflection of adaptor 48 controlling, for instance, the longitudinal-feed of a work table, piston 58 is also actuated, which starts to cut off, or may completely cut off, the exhaust from one side or the other of the cross-feed cylinder.

The result occasioned is that with a tracer regulation of the feed in one direction, feed in the other direction at right angles thereto is slowed down or stopped, by slowing down or stopping the exhaust from the other control cylinder.

It will be noted that a coil spring 63 is interposed between the bottom of cylinder 18 and lock nut 62, tending to force piston 58 downward.

The figure shows the piston 42 in a central position, wherein fluid under pressure at inlet 46 is entirely stopped. The neutral position above described would show the piston 42 slightly depressed from the position shown in the figure. Thus even slightly depressed fluid communication is established between fluid inlet 46 and the annular opening 43 within the piston 42.

As heretofore explained the valve 58 operates as a safety valve in that the constant feed movement in one direction is slowed up or stopped whenever there is a change in the direction of cross feeding movement of the work table. This prevents the bending or breaking of cutters, or the damage to work, which might otherwise occur if the feed remained constant while the reversal of direction of cross feed was even slightly late.

In neutral position by the action of springs 23 and 63 within the tracer, piston 42 is slightly below its central position whereby fluid under pressure from a fluid sump is free to enter opening 43 from inlet 46 and conduit 66, where it is conducted to one side of the longitudinal or cross-feed cylinders to which it may be connected through the above mentioned hand valve, producing feeding in one direction. As the adaptor 48 reaches an obstruction piston 42 is actuated to reverse the direction of feed. On the other hand, if piston 42 is initially actuated by a deflection of adaptor 48, the feed will be in one direction. Consequently, when that deflection is terminated the feed is automatically reversed by the resilient action of the valve 42.

Lateral pressure of the pattern against adaptor 48 adjacent tracer tip 11 causes lateral translation thereof through the stabilizer device above described. This lateral movement causes slight vertical movement of piston 42 governing either cross-feed or longitudinal-feed of the work table, depending upon the adjustment of said direction control valve.

In neutral position of piston 42 a pressure conduit 66 is provided to communicate with piston 42 at 46, 43, for actuating a cylinder piston on one side thereof. Movement of piston 42 by action of adaptor 48 permits fluid under pressure to enter the other side of the cylinder through 46 and 44 for effecting cross-feed or longitudinal-feed in the opposite direction. For instance, to change tracer control from cross-feed to longitudinal-feed requires a quarter of a turn of the hand wheel of the directional control valve. Whichever cylinder happens to be under tracer control on one side thereof, it will be noted that the exhaust from the other side is conducted back to said valve where it is directed back to piston 42 through either 43 or 44.

If the cross-feed cylinder happens to be tracer controlled then the longitudinal-feed cylinder is connected through the said directional control valve directly with a fluid pressure line which is independent of the tracer. The control of the longitudinal-feed in this case is by controlling the exhaust from the opposite side of the longitudinal-feed cylinder. This exhaust goes through said directional control valve, the operation of which is fully described in our co-pending application, Serial No. 366,082, and is permitted to return by a conduit 61 through the safety valve 58 back to the fluid sump through lines 60 and 60'.

The purpose of the safety valve is to slow up or stop entirely the feed movement in one direction whenever there is a feed in the other direction. This is accomplished by partially or completely cutting off the exhaust through said valve piston 58 from the particular longitudinal or cross-feed cylinder which happens to be connected thereto.

Whenever the tracer feed control through piston 42 is operated, the safety valve is actuated because the latter is supported thereby. Consequently, the purpose above set forth is accomplished whereby whenever there is tracer control in one direction, the feed in the direction at right angles thereto is either stopped entirely or slowed down to the speed of feed desired.

It will be noted that at neutral position by action of spring 23, piston 18 is slightly below the position shown in the figure. Consequently, fluid through 29 joins 19 and the lower end of the vertical feed cylinder through conduit 19' to cause vertical upward feed, until piston 18 is again in the position shown in the figure. When tracer tip 11 reaches an elevation or receives a substantially vertical thrust, spindle 12 is elevated slightly which raises piston 18, establishing fluid connection through 29, 20 and conduit 20' joined to the upper end of the vertical feed cylinder whereby the work table joined thereto is caused to descend.

Having described our invention, reference should now be had to the claims which follow for determining the scope thereof.

We claim:

1. A tracer mechanism adaptable for use in conjunction with a hydraulic profiling and contouring duplicating mechanism, comprised of a spindle, a housing into which one end of said spindle projects and with respect to which is axially movable upon a substantially vertical thrust thereto, said housing having a plurality of fluid inlets and outlets, a valve member within said housing and operably engaged by said spindle, adapted to direct fluid under pressure to one of two outlets, an adaptor loosely journaling said spindle adaptable to lateral translation on receipt of a lateral thrust, a stabilizer mechanism secured within said housing, a laterally translatable member therein joined to said adaptor, a valve piston within said housing adapted to axial movement on lateral movement of said adaptor for directing fluid under pressure to one of two other outlets, and an axially movable safety valve member within said housing secured to said adaptor controlled piston, for governing and regulating fluid flowing through said tracer housing from an inlet to an outlet.

2. A tracer mechanism adaptable for use in conjunction with a hydraulic profiling and contouring duplicating mechanism, comprised of a spindle, a housing into which one end of said spindle projects and with respect to which is axially movable upon a substantially vertical thrust thereto, said housing having a plurality of fluid inlets and outlets, a valve member within said housing and operably engaged by said spindle, adapted to direct fluid under pressure to one of two outlets, an adaptor loosely journaling said spindle adaptable to lateral translation on receipt of a lateral thrust, a stabilizer mechanism secured within said housing, a laterally translatable member therein joined to said adaptor, and a valve piston within said housing adapted to axial movement on lateral movement of said adaptor for directing fluid under pressure to one of two other outlets.

3. A tracer mechanism adaptable for use in conjunction with a hydraulic profiling and contouring duplicating mechanism, comprised of a spindle, a housing into which one end of said spindle projects and with respect to which is axially movable, said housing having a plurality of inlets and outlets; a valve member within said housing operably engaged by said spindle for directing fluid under pressure to one of two outlets from an inlet; an adaptor loosely journaling said spindle adaptable to lateral translation upon receiving a lateral thrust from a pattern; a stabilizer mechanism secured within said housing, a laterally translatable member therein joined to said adaptor with intermediate bearings interposed between said stabilizer and said laterally movable member; a second valve member within said housing adapted to axial movement upon lateral movement of said adaptor for directing fluid under pressure to one of two other outlets from a second inlet; and a safety valve mechanism within said housing secured to said adaptor controlled valve and carried thereby, governing fluid flowing through said housing from another inlet to another outlet, and resilient means within said housing engaging said valves to normally maintain the same to direct fluid out of one of said pairs of outlets.

4. A tracer mechanism adaptable for use in conjunction with a hydraulic profiling and contouring duplicating mechanism, comprised of a spindle, a housing having a plurality of fluid inlets and outlets; an adaptor means adaptable to lateral translation upon receiving a lateral thrust; a stabilizer mechanism within said housing having a laterally translatable member supported therein, with intermediate bearings interposed therebetween, joined to said adaptor; a valve member within said housing adapted to axial movement therein upon lateral movement of said adaptor for directing fluid under pressure from an inlet to one of two outlets; and a safety valve within said housing secured to said adaptor controlled valve and carried thereby for governing and regulating fluid flowing through said housing from another inlet and through another outlet.

5. A tracer mechanism adaptable for use in conjunction with a hydraulic profiling and contouring duplicating mechanism, comprised of a housing having a plurality of fluid inlets and outlets; an adaptor means adaptable to lateral translation upon receiving a lateral thrust; a stabilizer mechanism within said housing having a laterally translatable member supported therein, with intermediate bearings interposed therebetween, joined to said adaptor; a valve member within said housing adapted to axial movement therein upon lateral movement of said adaptor for directing fluid under pressure from an inlet to one of two outlets; and a safety valve within said housing secured to said adaptor controlled valve and carried thereby for governing and regulating fluid flowing through said housing from another inlet and through another outlet.

6. A tracer mechanism adaptable for use in conjunction with a hydraulic profiling and contouring duplicating mechanism, comprised of a spindle, a housing into which one end of said spindle projects and with respect to which is longitudinally movable upon a substantially vertical thrust thereto, said housing having a plurality of fluid inlets and outlets for respective communication to a fluid pressure source and to a fluid storage means; a valve member reciprocably journaled within said housing and operably engaged by said spindle for directing fluid from an inlet to one of two outlets, said outlets being adapted for connection by suitable conduits to opposite ends of a vertical work table control cylinder; an adaptor through which said spindle is loosely disposed, adapted to lateral translation upon receiving a lateral thrust; a stabilizer secured within said housing adapted to prevent tilting of said spindle and said adaptor, a laterally translatable member within said stabilizer, with bearing members therebetween, joined to said adaptor; a second valve within said housing adapted to axial movement on lateral movement of said adaptor for directing fluid under pressure from another inlet to one of two other outlets, the corresponding surfaces of said laterally translatable member and valve being angular, with a bearing surface interposed, said outlets being adaptable for connection to opposite ends of a transverse-feed cylinder; and a safety valve mechanism within said housing secured to said adaptor controlled valve and carried thereby, adaptable for connection by suitable conduit to either end of another transverse-feed cylinder for governing the flow of exhaust fluid therefrom.

7. A tracer mechanism adaptable for use in conjunction with a hydraulic profiling and contouring duplicating mechanism, comprised of a spindle longitudinally disposed therein and projecting beyond the end thereof, adapted to axial movement upon receiving a substantially axial thrust; a valve member reciprocably journaled within said housing and operably engaged by said spindle for directing fluid from an inlet to one of two outlets, said outlets being adapted for connection by suitable conduits to opposite ends of a vertical work table control cylinder; an adaptor loosely journaling said spindle adapted to lateral translation upon receiving a lateral thrust; a second valve within said housing adapted to axial movement on lateral movement of said adaptor for directing fluid under pressure from another inlet to one of two other outlets, said outlets being adaptable for connection to opposite ends of a transverse-feed cylinder; and a safety valve mechanism within said housing secured to said adaptor controlled valve and carried thereby, adaptable for connection by suitable conduit to either end of another transverse-feed-cylinder for governing the flow of exhaust fluid therefrom.

8. A tracer mechanism adaptable for use in conjunction with a hydraulic profiling and contouring duplicating mechanism, comprised of a spindle, a housing into which one end of said spindle projects and with respect to which is axially movable upon a substantially vertical thrust thereto, said housing having a plurality of fluid inlets and outlets, a valve member within said housing and operably engaged by said spindle, adapted to direct fluid under pressure to one of two outlets, an adaptor loosely journaling said spindle adaptable to lateral translation on receipt of a lateral thrust, a laterally translatable stabilizer member supported within said housing joined to said adaptor, a valve piston within said housing adapted to axial movement on lateral movement of said adaptor for directing fluid under pressure to one of two other outlets, and an axially movable safety valve member within said housing secured to said adaptor controlled piston, for governing and regulating fluid flowing through said tracer housing from an inlet to an outlet.

9. A tracer mechanism adaptable for use in conjunction with a hydraulic profiling and contouring duplicating mechanism, comprised of a spindle, a housing into which one end of said spindle projects and with respect to which is axially movable upon a substantially vertical thrust thereto, said housing having a plurality of fluid inlets and outlets, a valve member within said housing and operably engaged by said spindle, adapted to direct fluid under pressure to one of two outlets, an adaptor loosely journaling said spindle adaptable to lateral translation on receipt of a lateral thrust, a valve piston within said housing adapted to axial movement on lateral movement of said adaptor for directing fluid under pressure to one of two other outlets, and an axially movable safety valve member within said housing secured to said adaptor controlled piston, for governing and regulating fluid flowing through said tracer housing from an inlet to an outlet.

10. A tracer mechanism adaptable for use in conjunction with a hydraulic profiling and contouring duplicating mechanism, comprised of a spindle, a housing into which one end of said spindle projects and with respect to which is axially movable upon a substantially vertical thrust thereto, said housing having a plurality of fluid inlets and outlets, a valve member within said housing and operably engaged by said spindle, adapted to direct fluid under pressure to one of two outlets, an adaptor loosely journaling said spindle adaptable to lateral translation on receipt of a lateral thrust, a laterally translatable stabilizer member supported within said housing joined to said adaptor, and a valve piston within said housing adapted to axial movement on lateral movement of said adaptor for directing fluid under pressure to one of two other outlets.

11. A tracer mechanism adaptable for use in conjunction with a hydraulic profiling and contouring duplicating mechanism, comprised of a spindle, a housing into which one end of said spindle projects and with respect to which is axially movable upon a substantially vertical thrust thereto, said housing having a plurality of fluid inlets and outlets, a valve member within said housing and operably engaged by said spindle, adapted to direct fluid under pressure to one of two outlets, an adaptor loosely journaling said spindle adaptable to lateral translation on receipt of a lateral thrust, and a valve piston within said housing adapted to axial movement on lateral movement of said adaptor for directing fluid under pressure to one of two other outlets.

12. A tracer mechanism adaptable for use in conjunction with a hydraulic profiling and contouring duplicating mechanism, comprised of a spindle, a housing into which one end of said spindle projects and with respect to which is axially movable, said housing having a plurality of inlets and outlets; a valve member within said housing operably engaged by said spindle for directing fluid under pressure to one of two outlets from an inlet; an adaptor loosely journaling said spindle adaptable to lateral translation upon receiving a lateral thrust from a pattern; a stabilizer mechanism secured within said housing, a laterally translatable member therein joined to said adaptor with intermediate bearings interposed between said stabilizer and said laterally movable member; a second valve member within said housing adapted to axial movement upon lateral movement of said adaptor for directing fluid under pressure to one of two other outlets from a second inlet; and a safety valve mechanism within said housing secured to said adaptor controlled valve and carried thereby, governing fluid flowing through said housing from another inlet to another outlet.

13. A tracer mechanism adaptable for use in conjunction with a hydraulic profiling and contouring duplicating mechanism, comprised of a spindle, a housing having a plurality of fluid inlets and outlets; an adaptor means adaptable to lateral translation upon receiving a lateral thrust; a stabilizer mechanism within said housing having a laterally translatable member supported therein, with intermediate bearings interposed therebetween, joined to said adaptor; a valve member within said housing adapted to axial movement therein upon lateral movement of said adaptor for directing fluid under pressure from an inlet to one of two outlets.

14. A tracer mechanism adaptable for use in conjunction with a hydraulic profiling and contouring duplicating mechanism, comprised of a spindle, a housing having a plurality of fliud inlets and outlets; an adaptor means adaptable to lateral translation upon receiving a lateral thrust; a valve member within said housing adapted to axial movement therein upon lateral movement of said adaptor for directing fluid under pressure from an inlet to one of two outlets; and a safety valve within said housing secured to said adaptor controlled valve and carried thereby for governing and regulating fluid flowing through said housing from another inlet and through another outlet.

15. A tracer mechanism adaptable for use in conjunction with a hydraulic profiling and contouring duplicating mechanism, comprised of a housing having a plurality of fluid inlets and outlets; an adaptor means adaptable to lateral translation upon receiving a lateral thrust; a stabilizer mechanism within said housing having a laterally translatable member supported therein, with intermediate bearings interposed therebetween, joined to said adaptor; a valve member within said housing adapted to axial movement therein upon lateral movement of said adaptor for directing fluid under pressure from an inlet to one of two outlets.

16. A tracer mechanism adaptable for use in conjunction with a hydraulic profiling and contouring duplicating mechanism, comprised of a housing having a plurality of fluid inlets and outlets; an adaptor means adaptable to lateral translation upon receiving a lateral thrust; a valve member within said housing adapted to axial movement therein upon lateral movement of said adaptor for directing fluid under pressure from an inlet to one of two outlets; and a safety valve within said housing secured to said adaptor controlled valve and carried thereby for governing and regulating fluid flowing through said housing from another inlet and through another outlet.

17. A tracer mechanism adaptable for use in conjunction with a hydraulic profiling and contouring duplicating mechanism, comprised of a housing having a plurality of fluid inlets and outlets; an adaptor means adaptable to lateral translation upon receiving a lateral thrust; a stabilizer mechanism within said housing having a laterally translatable member supported therein, joined to said adaptor; a valve member within said housing adapted to axial movement therein upon lateral movement of said adaptor for directing fluid under pressure from an inlet to one of two outlets; and a safety valve within said housing secured to said adaptor controlled valve and carried thereby for governing and regulating fluid flowing through said housing from another inlet and through another outlet.

18. A tracer mechanism adaptable for use in conjunction with a hydraulic profiling and contouring duplicating mechanism, comprised of a spindle longitudinally disposed therein and projecting beyond the end thereof, adapted to axial movement upon receiving a substantially axial thrust; a valve member reciprocably journaled within said housing and operably engaged by said spindle for directing fluid from an inlet to one of two outlets, said outlets being adapted for connection by suitable conduits to opposite ends of a vertical work table control cylinder; an adaptor loosely journaling said spindle adapted to lateral translation upon receiving a lateral thrust; a second valve within said housing adapted to axial movement on lateral movement of said adaptor for directing fluid under pressure from another inlet to one of two other outlets, said outlets being adaptable for connection to opposite ends of a transverse-feed cylinder.

MANUEL TURCHAN.
CURTIS WALKER.